United States Patent
Shedivy et al.

(10) Patent No.: US 6,681,580 B2
(45) Date of Patent: Jan. 27, 2004

(54) ICE MACHINE WITH ASSISTED HARVEST

(75) Inventors: Scott J. Shedivy, Two Rivers, WI (US); Timothy J. Kraus, Two Rivers, WI (US); Charles E. Schlosser, Manitowoc, WI (US); Mathew E. Kampert, Manitowoc, WI (US); Richard T. Miller, Manitowoc, WI (US)

(73) Assignee: Manitowoc Foodservice Companies, Inc., Sparks, NV (US)

(*) Notice: Subject to any disclaimer, the term of this patent is extended or adjusted under 35 U.S.C. 154(b) by 0 days.

(21) Appl. No.: 10/236,488

(22) Filed: Sep. 6, 2002

(65) Prior Publication Data

US 2003/0046942 A1 Mar. 13, 2003

Related U.S. Application Data

(60) Provisional application No. 60/318,791, filed on Sep. 12, 2001.

(51) Int. Cl.$^7$ .................................................. F25C 5/10
(52) U.S. Cl. ............................................. 62/73; 62/352
(58) Field of Search ..................................... 62/73, 352

(56) References Cited

U.S. PATENT DOCUMENTS

| | | |
|---|---|---|
| 3,430,452 A | 3/1969 | Dedricks et al. |
| 4,341,087 A | 7/1982 | Van Steenburgh, Jr. |
| 4,366,679 A | 1/1983 | Van Steenburgh, Jr. |
| 4,448,598 A | 5/1984 | LaMonica et al. |
| 4,459,824 A | 7/1984 | Krueger |
| 4,474,023 A | 10/1984 | Mullins, Jr. |
| 4,489,566 A * | 12/1984 | Saltzman ............. 62/73 |
| 4,489,567 A | 12/1984 | Kohl |
| 4,531,380 A | 7/1985 | Hagen |
| 4,622,832 A | 11/1986 | Hagen |
| 4,651,537 A | 3/1987 | Hagen |
| 4,688,386 A | 8/1987 | Lane et al. |
| 4,694,656 A | 9/1987 | Lane et al. |
| 4,727,729 A | 3/1988 | Toya |
| 4,732,006 A | 3/1988 | Fischer |
| 4,823,559 A | 4/1989 | Hagen |
| 4,843,827 A | 7/1989 | Peppers |
| 4,903,506 A | 2/1990 | Delisle et al. |
| 4,947,653 A | 8/1990 | Day et al. |
| 5,014,523 A | 5/1991 | Kohl |
| 5,042,263 A | 8/1991 | Day et al. |
| 5,129,237 A | 7/1992 | Day et al. |
| 5,140,831 A | 8/1992 | Kohl et al. |
| 5,586,439 A | 12/1996 | Schlosser et al. |
| 5,924,301 A | 7/1999 | Cook |
| 6,145,324 A | 11/2000 | Dolezal |
| 6,196,007 B1 | 3/2001 | Schlosser et al. |
| 6,209,340 B1 | 4/2001 | Lu |

* cited by examiner

Primary Examiner—William E. Tapolcai
(74) Attorney, Agent, or Firm—Steven P. Shurtz; Brinks Hofer Gilson & Lione

(57) ABSTRACT

A method of making and harvesting ice cubes includes freezing water in an ice-forming mold having a back surface, an open front face and dividers mounted on the back surface forming pockets for the formation of individual ice cubes, the water also forming ice bridges between the ice formed in the pockets, thus forming a slab of ice cubes; heating the ice-forming mold to release the ice cubes from their individual pockets; and using pressurized fluid to push the frozen slab of ice cubes out of the ice-forming mold. An ice making machine for practicing the present invention preferably includes an air compressor to supply compressed air as the pressurized fluid. The compressed air is directed preferably through a plurality of holes in the back of the ice-forming mold. Weep holes in the dividers allow this pressurized air to migrate from these holes to the areas behind each of the pockets in the ice-forming mold, thus applying a uniform pressure over a large surface area to assist the slab of ice in releasing from the ice-forming mold. The assisted harvest greatly increases the energy efficiency of the ice machine.

31 Claims, 9 Drawing Sheets

ICE MACHINE WITH ASSISTED HARVEST

REFERENCE TO EARLIER FILED APPLICATION

The present application claims the benefit of the filing date under 35 U.S.C. §119(e) of Provisional U.S. Patent Application Ser. No. 60/318,791, filed Sep. 12, 2001, which is hereby incorporated by reference.

BACKGROUND OF THE INVENTION

The present invention relates to an ice making machine, and more particularly to a cube ice making machine utilizing a defrost harvest cycle with assisted ice release.

There are several major types of automatic ice making machines. Predominant forms of ice produced in such machines are cubes and flakes. Cubes are preferred for cooling carbonated beverages served in cups because cube ice generally causes less foaming of the beverage.

Cube ice making machines themselves come in a number of varieties. Some form individual ice cubes, while others, referred to as slab-type machines, have a grid of ice forming pockets that freeze individual cubes. When the cubes are to be harvested, the ice starts to melt. Just as water expands as it freezes into ice, the ice and water contract as the ice starts to melt. This creates a vacuum in the pockets. In addition, as the ice tries to slide out of the pockets, the surface tension of the water holds the water between the ice cube and the grid side walls. This adds to the vacuum, which must be broken before the cubes will slide out of the pockets. Preferably, ice is allowed to freeze over the edges of the grid to bridge between individual cubes. When it is time to harvest the cubes, the ice bridge holds the cubes together and makes the cubes all come out in one slab once the vacuum is overcome, thus helping to achieve a complete harvest.

The thickness of the bridge can be controlled by adjusting an ice thickness sensor. Usually a thicker bridge is desirable from a harvest standpoint, so that all of the cubes come out with the slab. Also, it has been found that larger ice bridges cause the ice to harvest in a shorter amount of time. On the other hand, thick ice bridges prevent the individual cubes from breaking apart when the ice falls into a bin. Large clumps must be broken up with a scoop before the ice can be added to a cup. Also, because the ice acts as an insulator, it takes longer to form the next incremental layer of ice the thicker the ice bridge becomes. In terms of the overall production rate of the machine, this offsets the benefit of faster harvest times achieved with thicker ice bridges.

Many cube ice machines use a "hot gas defrost system" to heat the ice-forming mold to harvest the ice. In these machines, hot refrigerant vapor from the compressor is routed through a hot gas valve to bypass the condenser and expansion device in the normal refrigeration system. The hot refrigerant is fed directly into the evaporator. During the harvest cycle, the evaporator actually works as a condenser. The refrigerant cools and condenses, and the latent heat of the phase change of the refrigerant is used to "defrost" the evaporator and heat the ice-forming mold. This system is very reliable, but has a number of drawbacks. First, condensed refrigerant may be returned to the compressor. Compressors can be damaged if too much refrigerant is condensed and returned in a liquid state. Also, the heat added to the evaporator melts ice that was previously frozen, reducing the ice production for that cycle. Also, heat that increases the temperature of the ice-forming mold must be removed in the next freeze cycle. Thus the hot gas defrost cycle has a negative impact on the energy efficiency of the ice machine, measured in terms of pounds of ice produced per kilowatt-hour (kwh) of electricity used.

In many refrigeration systems, such as home air conditioners, energy efficiency can be improved by reducing the size of the compressor and using a lower head pressure, and utilizing a larger evaporator. However, in an ice machine using hot gas defrost, this approach would have only a limited improvement on efficiency, because the smaller compressor and larger evaporator would cause a longer defrost cycle. The machine would thus spend more of its time in the harvest mode. The amount of ice produced in a given quantity of time would then be reduced. Thus, even though less energy is required to operate the machine, less ice is produced during the time it is running.

U.S. Pat. No. 4,341,087 and No. 4,366,679 disclose an ice making machine with a mechanical device to assist the harvest. A harvesting plunger is activated by a motor to push through the back side of an evaporator plate against one of the cubes of ice in the ice-forming mold. In theory this plunger thus acts to push the entire slab of ice out of the ice-forming mold in a reduced harvest time. The reduced harvest time results in greater theoretical efficiency. However, in practice, commercial ice making machines with this mechanical harvest assist have had reliability problems. Sometimes only the cube of ice being pushed against by the harvesting plunger, and perhaps a few surrounding cubes, are ejected. Since the remaining ice is not pushed out, the machine goes back into a freeze cycle without harvesting all of the ice.

Another commercial ice making machine uses water to wash down over the front of ice cubes that are formed in individual pockets during a harvest cycle. While this speeds up the harvest cycle, it also produces "wet ice". When wet ice sits in an ice storage bin, the ice cubes tend to freeze together.

Another commercial ice making machine uses water on the back side of the ice-forming mold to help quickly defrost and harvest the ice. However, this approach has its own drawbacks. The water used to defrost is then used as make-up water for the next batch of ice. The back side of the ice-forming mold is not very accessible or cleanable. Therefore using the water that has flowed over the back side of the ice-forming mold to make ice which will be consumed is a very questionable practice from a sanitation standpoint.

U.S. Pat. No. 4,489,567 discloses an ice machine that also uses a mechanical pusher to help assist in ice harvest. However, the pusher is spring activated. A diaphragm with water pressure holds the spring and plunger back during the freeze cycle. This design has never been commercially practiced, in part because of the same reliability problems encountered with the motor driven pusher in U.S. Pat. No. 4,341,087.

U.S. Pat. No. 4,843,827 discloses an apparatus for making ice cubes that vibrates the ice forming mold to help release the ice cubes during harvest. The ice forming mold is made with breather vents in the back side of each ice-forming pocket. The patent goes on to state that positive pressure could be introduced through these breather vents. While no source for the positive pressure is shown, a simple diaphragm compressor is suggested. To the best of applicants' knowledge, no commercial equipment has been made following the teachings of this patent. Further, it appears that the design of the ice-forming mold is for making only individual cubes, and not slab ice. Also, the air vents are all connected together. Thus, once one of the cubes of ice is released, the air pressure in the entire system would be relieved through the vent hole where the ice cube is no longer blocking it, and no pressure would build up to help push other ice cubes out.

It would be very beneficial if a reliable method were developed that would improve the energy efficiency of ice making machines. A method that would shorten the duration of the harvest cycle without encountering the problems of sanitation, reliability, wet ice or commercial non-viability would also be a significant benefit.

SUMMARY OF THE INVENTION

A method of making and harvesting ice cubes in a more energy efficient manner, without the drawbacks enumerated above, and an ice-making machine for practicing the method, have now been invented.

In a first aspect, the present invention is an ice making machine comprising a refrigeration system including a compressor, a condenser, an expansion device, an evaporator made with refrigerant channels formed in a serpentine shape, and interconnecting lines therefore; a water system including a pump and an ice-forming mold having a back surface and an open front face to form a slab of ice, the serpentine channels of the evaporator being in thermal contact with the back surface of the ice-forming mold; and interconnecting lines therefore; and a harvest assist system comprising the at least one hole through the back surface of the ice-forming mold and a source of pressurized fluid, either liquid or gas, connected to the at least one hole.

In a second aspect the present invention is a method of making and harvesting ice cubes comprising freezing water in an ice-forming mold having a back surface, an open front face and dividers mounted on the back surface forming pockets for the formation of individual ice cubes, the water also forming ice bridges between the ice formed in the pockets, thus forming a slab of ice cubes; heating the ice-forming mold to release the ice cubes from their individual pockets; and using pressurized fluid to break the vacuum and begin to push the frozen slab of ice cubes out of the ice-forming mold.

In a third aspect, the present invention is a method of improving the energy efficiency of an ice making machine that forms individual cubes of ice in an ice-forming mold with ice bridges between the cubes to form a slab, the improvement comprising introducing pressurized air between the slab of ice and the ice-forming mold in conjunction with heating the ice-forming mold to assist release of the cubes of ice.

The preferred ice making machine uses pressurized air, introduced at strategic locations, behind the slab of ice to dramatically shorten the harvest cycle time. Because the harvest cycle is shorter, less heat energy is put back into the ice-forming mold. Thus, not only is more of the compressor run time used to freeze ice, but the heat needed to be removed by the refrigeration system at the end of the harvest cycle to cool the ice-forming mold back to a freezing temperature is reduced. The system is also proving to be highly reliable, with an evenly applied force to prevent one cube from being popped out of the slab, leaving the rest behind. Unexpectedly, the best efficiencies in harvest time have been found to coincide with a fairly thin ice bridge. This results in cubes which easily separate from one another when they fall into an ice bin, giving customers desirable independent ice cubes at the same time as high energy efficiency.

The invention is also useful with ice machines that use other types of defrost systems. U.S. Pat. No. 6,196,007, which is hereby incorporated by reference, discloses a cube ice making machine that uses cool refrigerant vapor to defrost the evaporator and harvest the ice. The present invention can improve the harvest time on such a cool vapor defrost system. As can be seen in this patent, it is not necessary for all parts of the ice machine to be housed in the same cabinet These and other advantages of the invention, as well as the invention itself, will be best understood in light of the attached drawings.

DETAILED DESCRIPTION OF THE DRAWINGS AND PREFERRED EMBODIMENTS OF THE INVENTION

A preferred ice making machine of the present invention is very similar to a model QY-1004A ice machine sold by Manitowoc Ice, Inc., Manitowoc, Wis. Many parts of the machine are the same as those shown in U.S. Pat. No. 5,586,439, incorporated herein by reference, and are therefore not shown or discussed in detail. The term "ice cube" used herein has its general meaning in the ice machine business. Ice cubes can be of many sizes and shapes, although rectangular shapes are preferred in the present invention.

Figure 1:
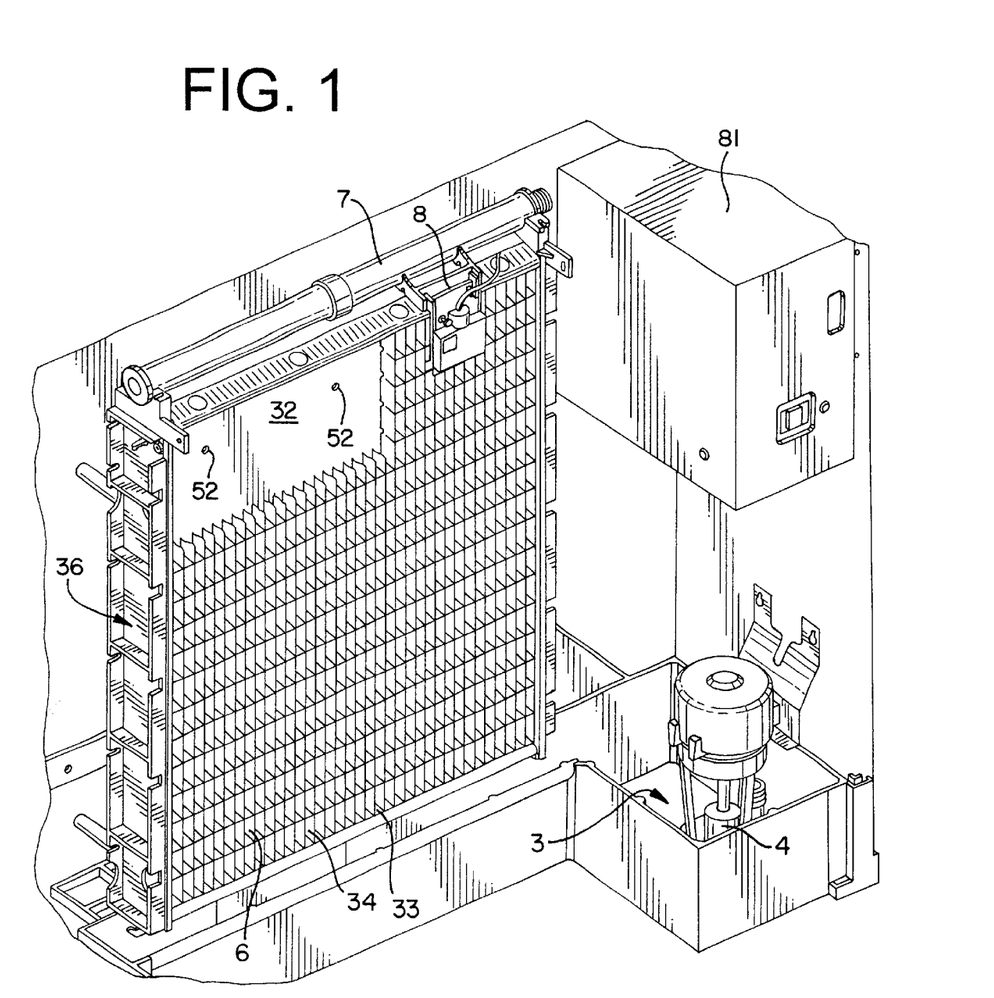
FIG. 1 is a perspective view of the ice making compartment in a preferred ice making machine of the present invention; with several sections of the dividers making up the ice-forming mold removed from the evaporator assembly for sake of clarity.
Figure 2:
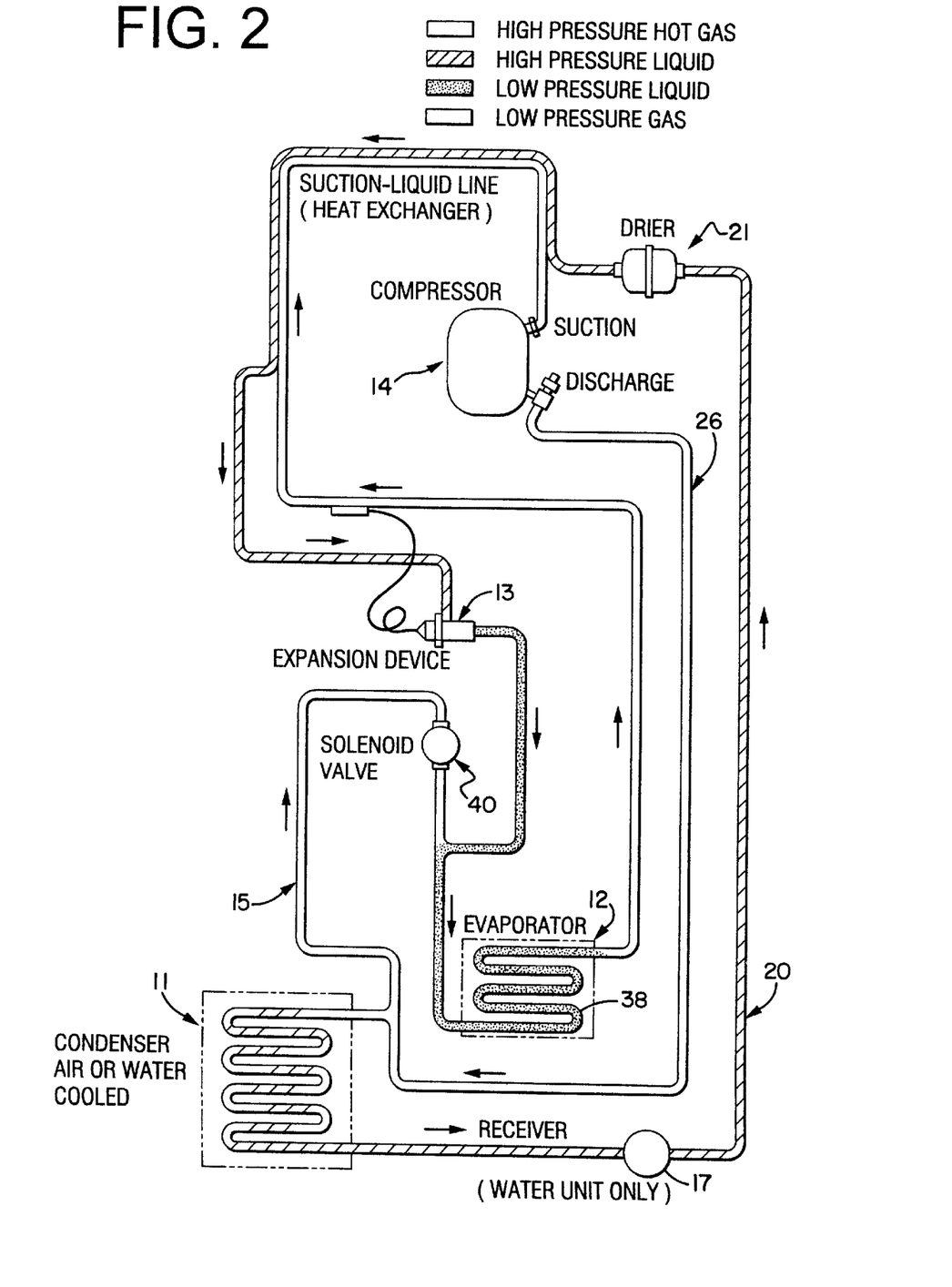
FIG. 2 is a schematic drawing of the refrigeration system of the ice making machine of FIG. 1.
Figure 3:
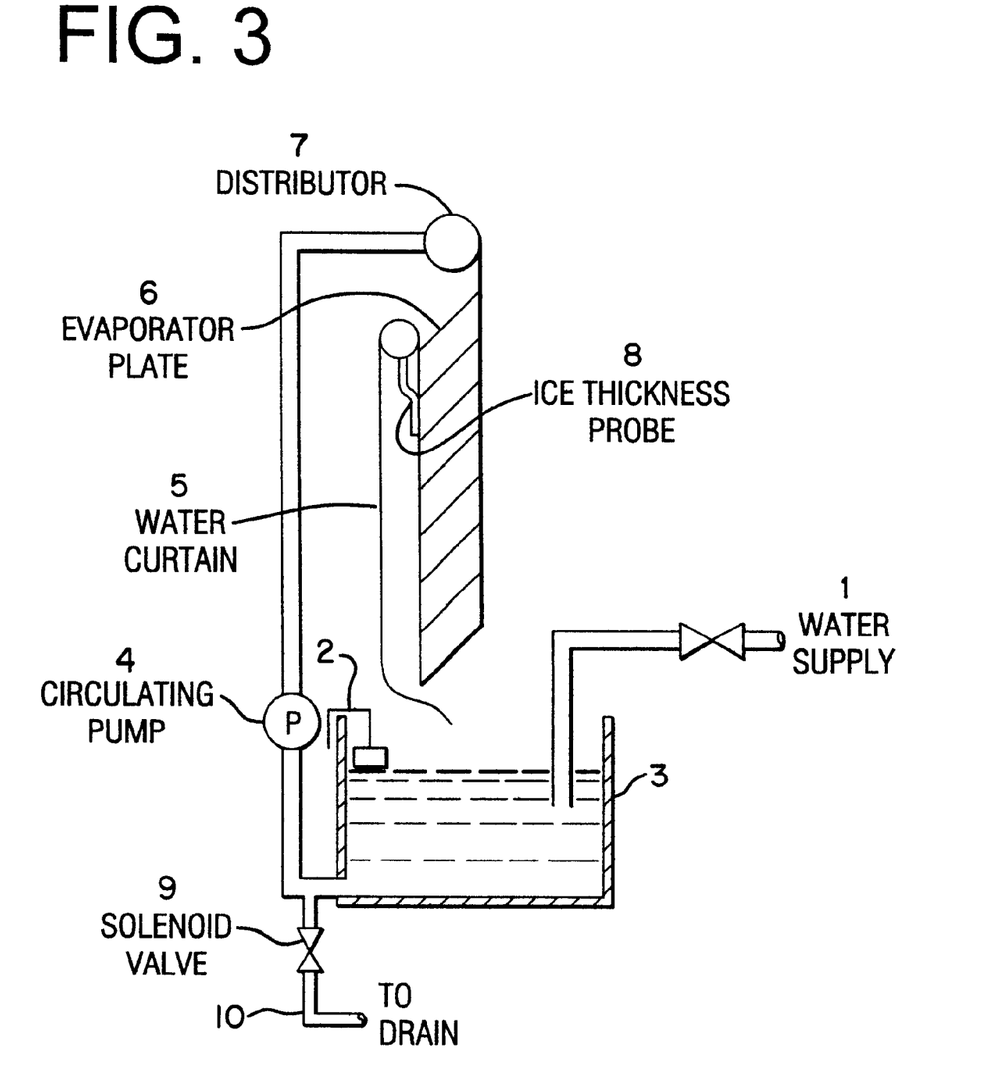
FIG. 3 is a schematic diagram of the water system of the ice making machine of FIG. 1.
Figure 8:
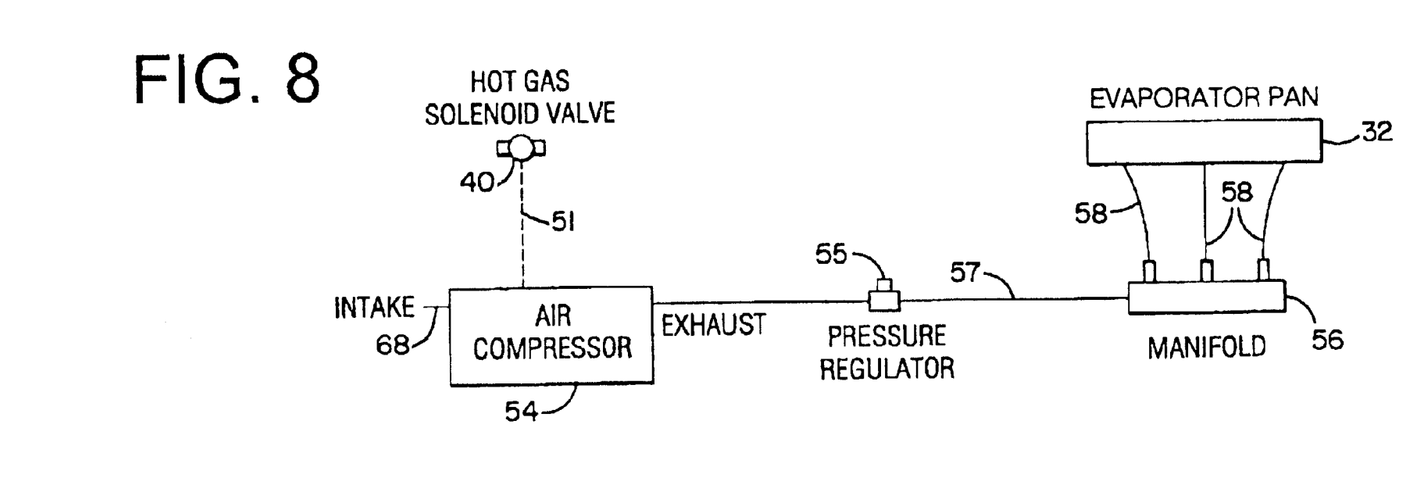
FIG. 8 is a schematic diagram of the harvest assist system of the ice making machine of FIG. 1.
Figure 9:
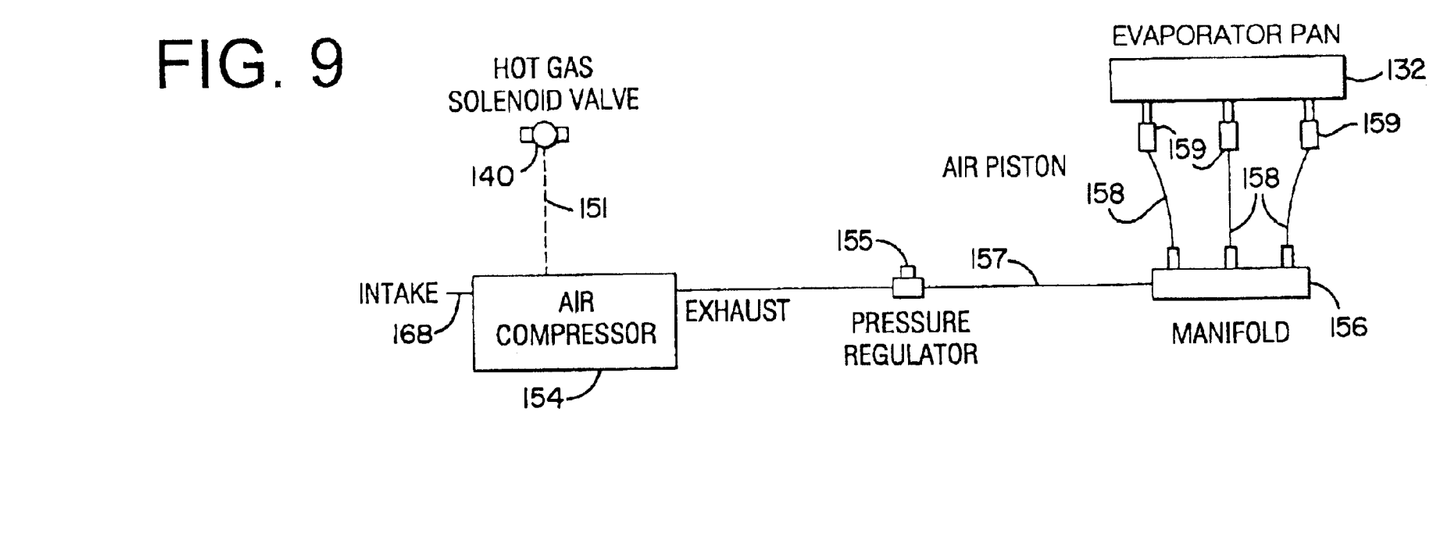
FIG. 9 is a schematic diagram of an alternate harvest assist system that may be used on the ice machine of FIG. 1.
Figure 10:
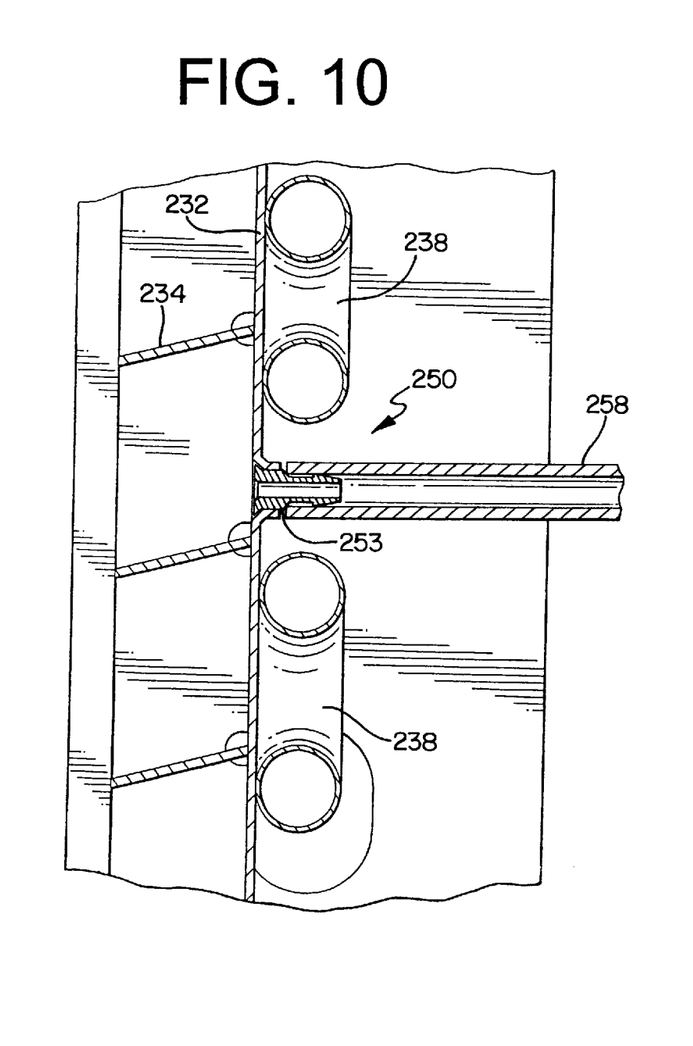
FIG. 10 is a cross-sectional view like FIG. 6 but of an alternate embodiment of an air hose connector and nozzle assembly.
Figure 11:
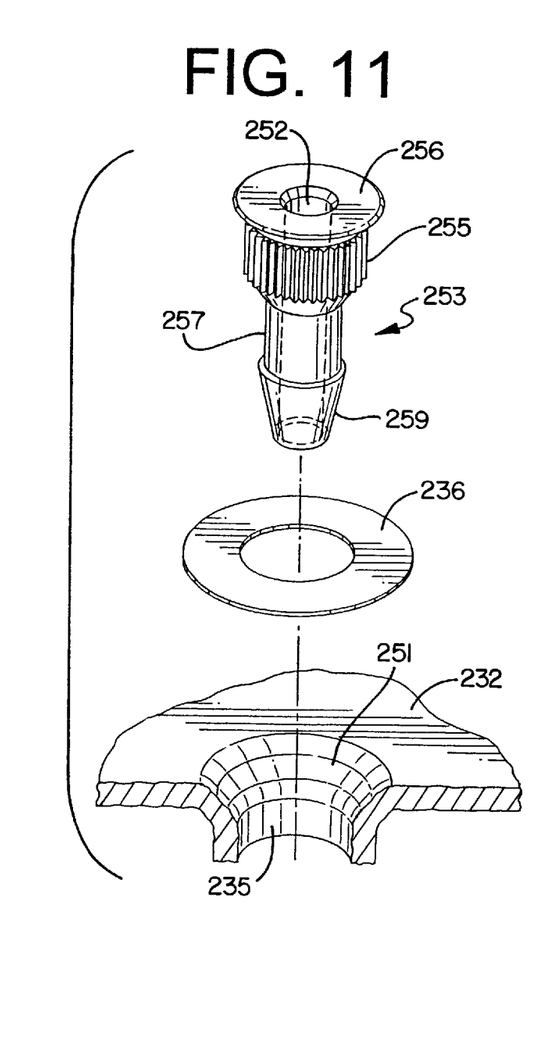
FIG. 11 is an exploded view of the air hose connector and nozzle assembly used in the embodiment of FIG. 10.
Figure 12:
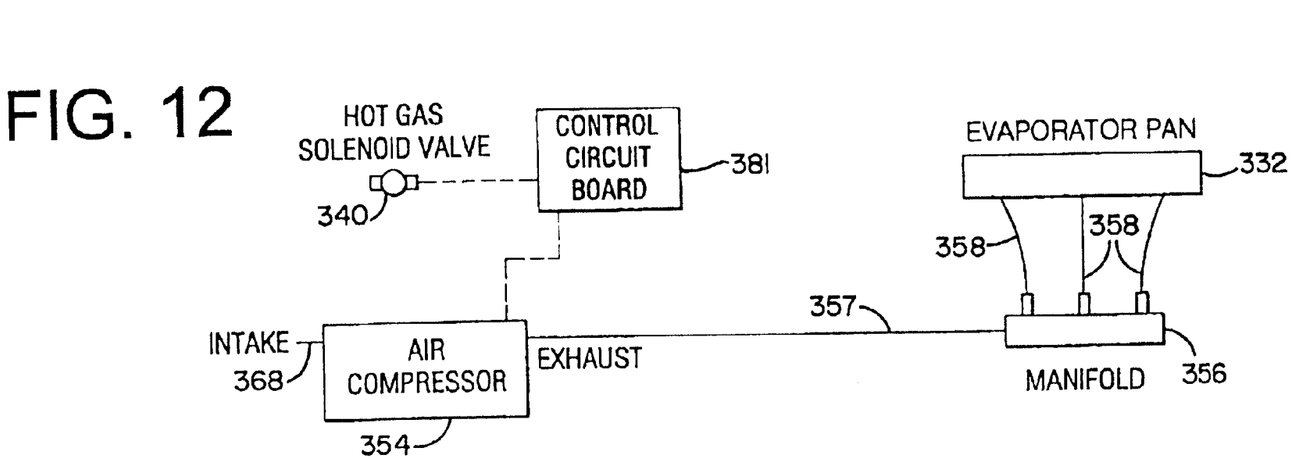
FIG. 12 is a schematic diagram of a second alternate harvest assist system that may be used on the ice machine of FIG. 1.
Figure 13:
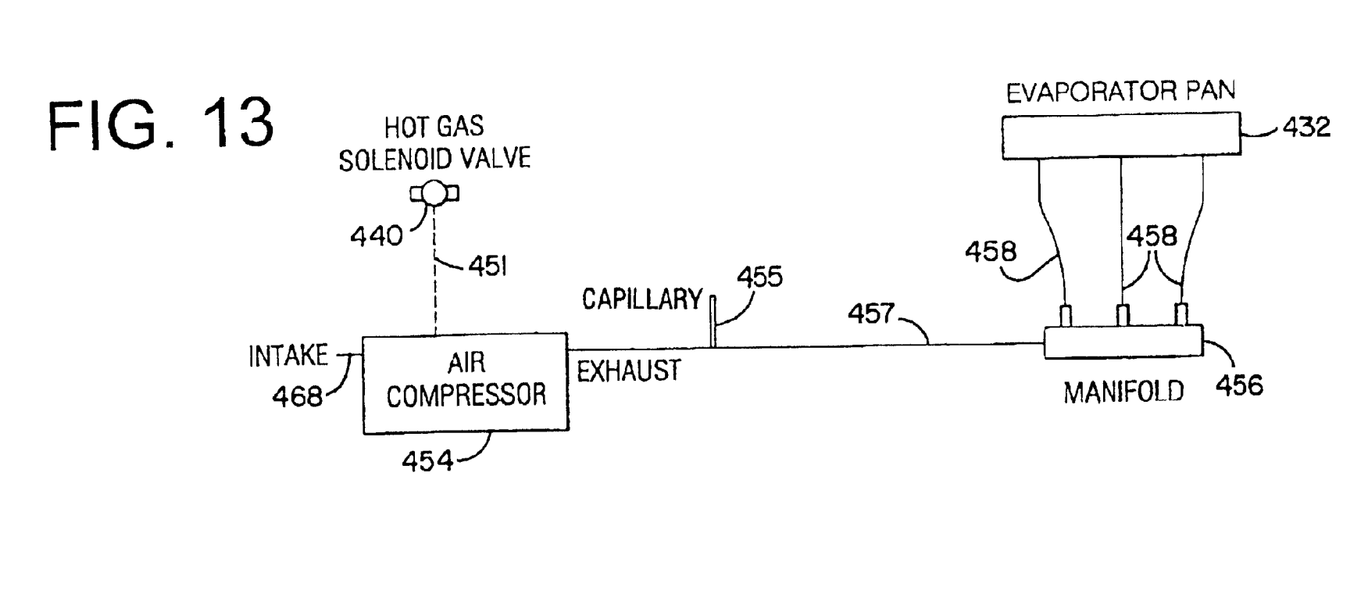
FIG. 13 is a schematic diagram of a third alternative harvest assist system that may be used on the ice machine of FIG. 1.

The preferred ice making machine of the present invention has three major systems: a refrigeration system, a water system and a harvest assist system. Components and systems of the preferred ice making machine of the present invention are shown in FIGS. 1–8. FIG. 2 is a schematic diagram of the refrigeration system. FIG. 3 is a schematic diagram of the water system. FIG. 8 is a schematic diagram of the harvest assist system. Some of the components of these systems, as well as other components of the ice making machine, are shown in FIGS. 1 and 4–7. FIGS. 9, 12 and 13 disclose alternate harvest assist systems. FIGS. 10 and 11 disclose a preferred air hose connector and nozzle assembly.

As shown in FIG. 3, the preferred water system, which is conventional for Manitowoc-brand cube ice machines, includes a water supply or inlet 1. A water level probe 2 is used to control the depth of water in a sump 3. A circulating pump 4 draws water out of the sump and pumps it up to a distributor tube 7. Water falls from the distributor tube 7 over the ice-forming mold, sometimes also known as an evaporator plate 6. A water curtain 5 keeps water from splashing out of the front of the water compartment and directs water that does not freeze back into the sump 3. An ice thickness sensor or probe 8 is used to monitor the build-up of the ice bridge on the front of the ice-forming mold 6. When the machines goes into a harvest mode, a solenoid valve 9 is opened to allow water from the sump to enter a drain line 10. Alternatively, the drain line 10 and solenoid 9 can be located after the pump, so that the water in the sump is pumped out to the drain. FIG. 1 shows several of these components, although the water curtain 5 is removed and other components such as the water line interconnecting the pump 4 and the distributor 7 are not shown in the perspective view of the water compartment shown in FIG. 1. FIG. 1 also shows the location of the electrical controls housed in compartment 81.

The preferred refrigeration system is also conventional in its overall components and arrangement, as shown in FIG. 2. However, the various components and the amount of refrigerant used in the system must be sized to take into account the reduced harvest time. The refrigeration system includes a compressor 14, a condenser 11 (which may be air or water cooled), an expansion device 13, such as a Danfoss (TU series) expansion valve, an evaporator 12 and interconnecting lines 15, 20 and 26 therefore. The evaporator 12 is preferably made with refrigerant channels formed in a serpentine shape, such as serpentine coils of tubing 38. A hot gas solenoid valve 40, drier 21 and, on water cooled units, a receiver 17 are also preferably included in the refrigeration system. As noted earlier, the present invention can also be used on an ice making machine utilizing cool vapor defrost. The refrigeration system for such a machine is shown in U.S. Pat. No. 6,196,007.

Figure 4:
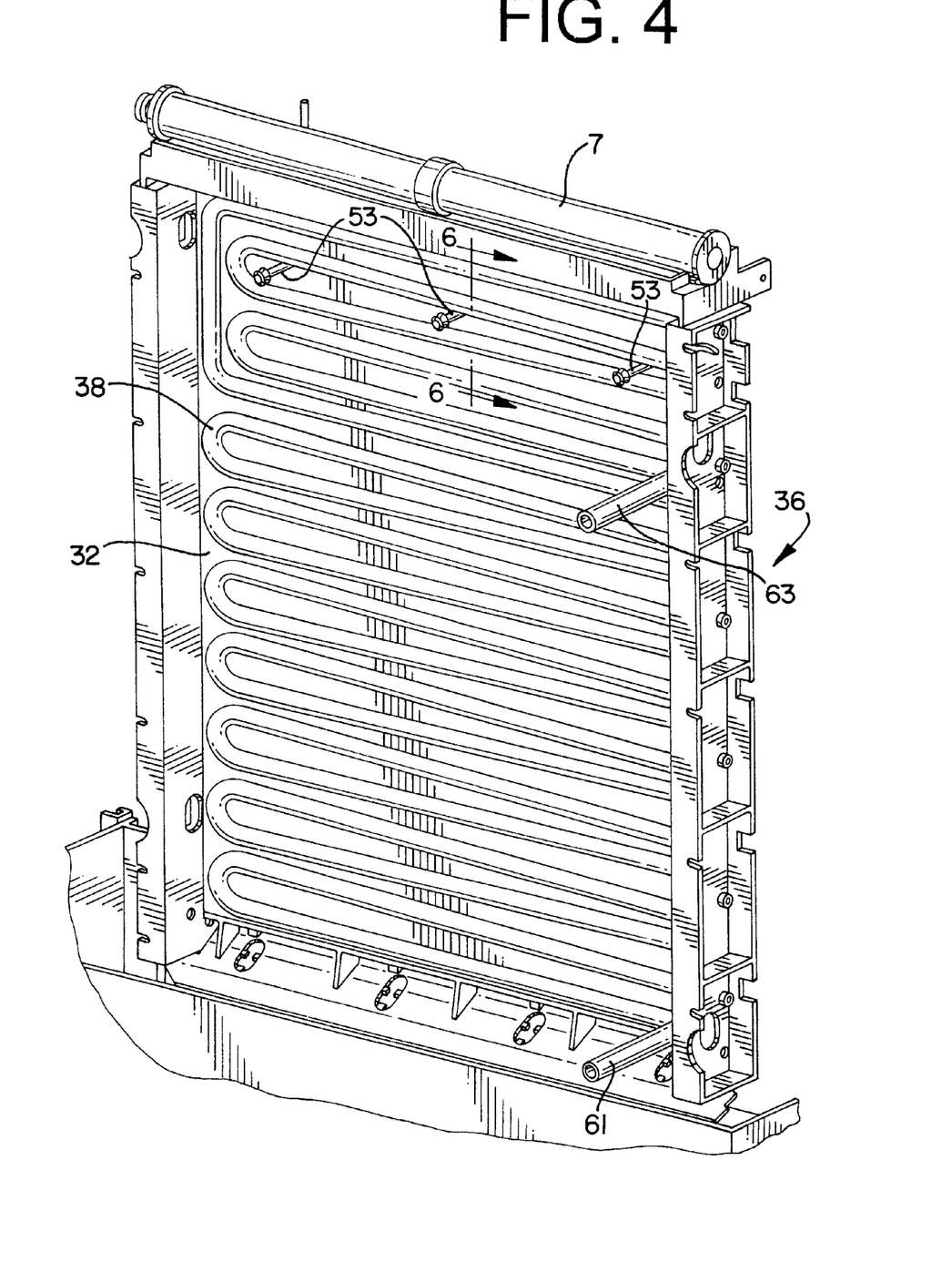
FIG. 4 is a rear perspective view of the evaporator assembly used in the ice making machine of FIG. 1.
Figure 5:
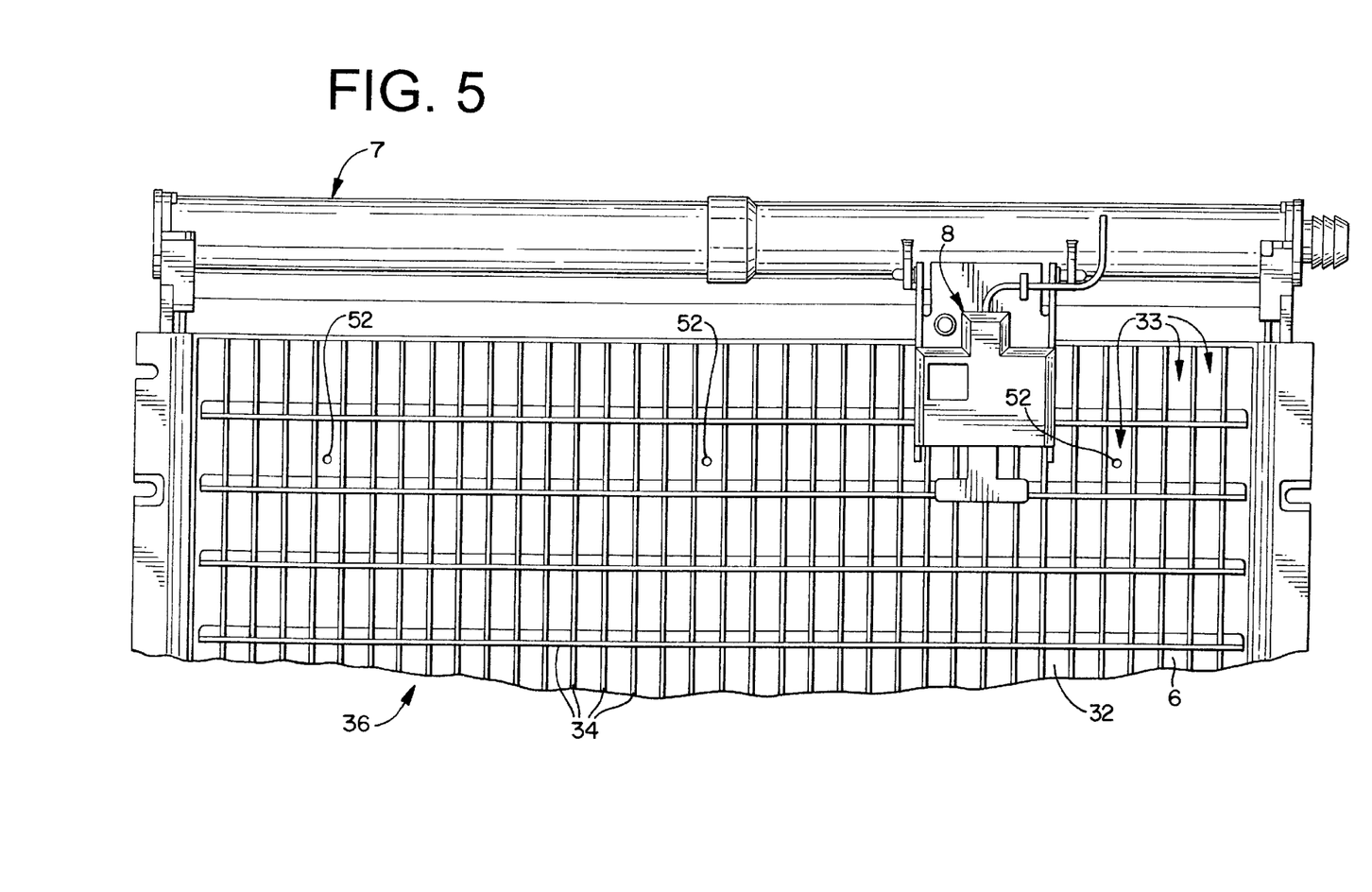
FIG. 5 is a front elevational view of the top portion of the evaporator assembly of FIG. 4.
Figure 6:
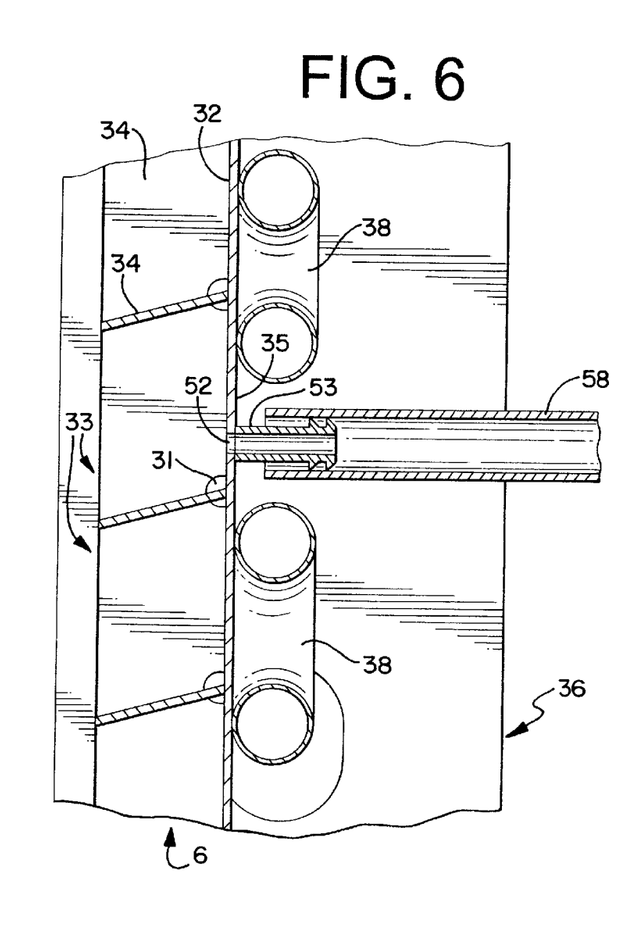
FIG. 6 is a cross-sectional view taken along line 6—6 through the evaporator assembly of FIG. 4.
Figure 7:
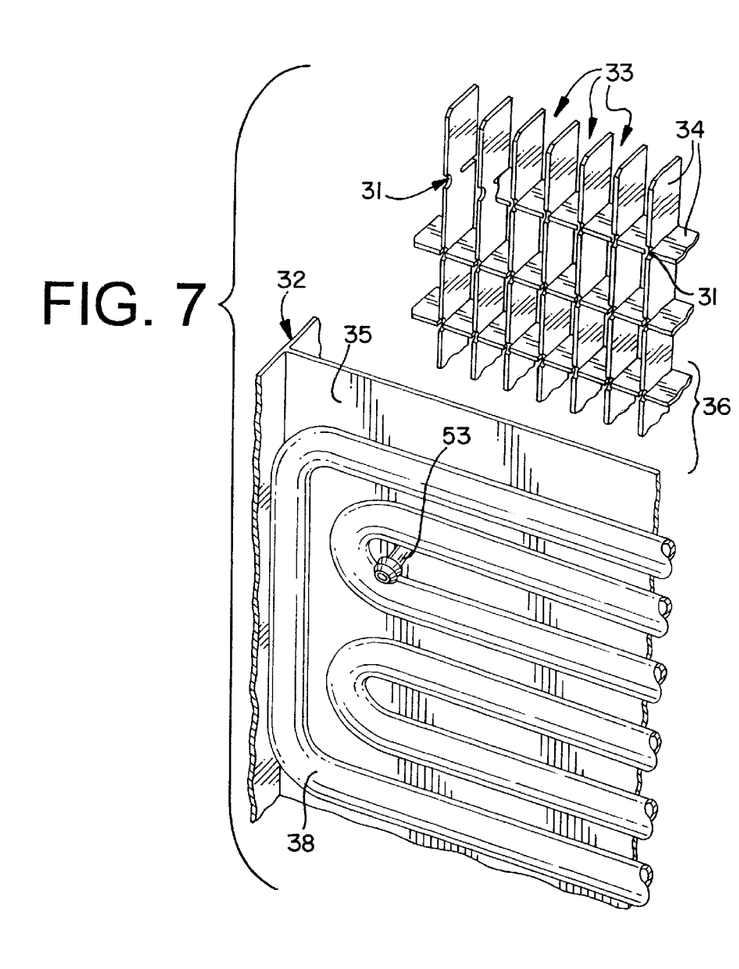
FIG. 7 is an exploded rear perspective view of a portion of the evaporator assembly of FIG. 4.

The ice-forming mold is preferably part of an evaporator assembly 36, best seen in FIGS. 1 and 4–7. The ice-forming mold itself is made up of an evaporator pan 32 and dividers 34. The evaporator tubing coils 38 are attached in thermal contact to the back side of the evaporator pan 32, which is preferably flat, to make up the evaporator assembly 36. The back side of the evaporator pan forms the back surface 35 of the ice-forming mold 6 (FIG. 6). The dividers 34, also sometimes referred to as grids, divide the area inside of the evaporator pan into pockets 33 in which individual ice cubes are frozen. The ice-forming mold has an open front face. Water runs down over this front face and wicks to the inside of the pockets 33 during the freeze mode. Water freezing over the edges of the dividers 34 forms ice bridges between the cubes frozen in the individual pockets. The thickness of the ice bridges and the ice cubes themselves are monitored by the ice thickness sensor 8 in a conventional manner. When the ice bridge reaches a desired thickness, the ice machine control system, which is also conventional, triggers the ice machine to enter the harvest mode. The dividers 34 preferably include weep holes 31, best seen in FIGS. 6 and 7. When the dividers 34 are attached to the evaporator pan 32, the weep holes 31 allow water to run into adjoining pockets 33 from the back, in addition to water that flows in from the open front face. As explained below, these weep holes 31 also are used by the preferred harvest assist system.

As shown in FIGS. 5 and 6, the horizontal dividers are sloped so that the pockets 33 have a bottom surface that is sloped downwardly at the front, open face of the ice-forming mold 6. This is conventional, and in this regard gravity is used to release ice cube slabs from the ice-forming mold 6 during the defrost cycle. The pressurized fluid supplied by the harvest assist system, preferably air, thus works with gravity to assist in causing the released ice cubes to fall from the ice-forming mold once the vacuum is broken and the ice cubes are released from the dividers.

The harvest assist system is best understood by referring to FIGS. 6 and 8. The main elements of the preferred system include at least one hole 52 through the back surface 35 of the ice-forming mold 6 and a source of pressurized fluid (either liquid or gas), such as an air compressor or pump 54, connected to the at least one hole 52. The compressor can be connected to the control system for the ice machine through electrical line 51 so that it turns on at the same time that the relay energizes the hot gas defrost bypass solenoid 40, as depicted in FIG. 8. The pressure in lines 57 and 58 starts to build. However, until the ice starts to release, the pressure regulator relief valve 55 can relieve pressure to keep the pressure at the desired level.

As shown in FIG. 8, a plurality of holes 52 are preferably used, with a manifold 56 and a plurality of fluid lines 58 interconnecting the manifold 56 and the plurality of holes 52. The fluid lines connect to the holes 52 through fittings 53 (FIG. 6) secured to the evaporator pan 32. The fittings 53 preferably have a conventional barbed tubing connector at their free end, as shown in FIGS. 6 and 7. In this manner the fluid lines 58 can be easily connected to the fittings 53 during assembly of the ice machine.

A preferred air hose connector and nozzle assembly 250 is shown in FIGS. 10 and 11. In this embodiment, the evaporator pan 232 has holes 235 punched into it, with a beveled shape 251. A barbed fitting 253 has a central tubular section 257 with a knurled shoulder 255 and a flange 256 on one end, and the barbed tubing connector 259 on the other end. A hole 252, which acts as the air discharge nozzle, extends through the flange 256 and connects to the air passageway through the center tubular section 257 and tubing connector 259. The assembly 250 also includes a washer 236 made of solder, which is placed around the tubular section 257 before the fitting 253 is forced into hole 235. The knurled shoulder 255 grips tight into the hole 235. The solder washer 236 fits between the flange 256 and the beveled shape 251. When the evaporator pan 232 is heated to have the coils 238 and dividers 234 assembled to it, the solder washer 236 melts and the fittings 253 are securely held in place. Thereafter the air hose 258 is attached to the barbed end 259.

The number and placement of the holes 52 has been discovered to be a significant contribution in optimizing the harvest assist system. It has been discovered that preferably 3 or 4 holes be used, each about ⅛ inch in diameter. Four holes have been found sufficient for ice-forming molds that are 29-½ inches wide. Three holes are sufficient for evaporators that are less than 29 inches wide. The holes are preferably placed in the part of the ice-forming mold where the ice is last to release during the harvest cycle. This location is a function of the shape of the serpentine tubing configuration.

The tubing coils 38 are arranged on the back side 35 of the evaporator pan 32 so as to optimize the freezing performance of the evaporator assembly. As shown in FIG. 4, the inlet 61 to the coils 38 is located at the bottom of the evaporator assembly 36. In this regard, liquid refrigerant from the expansion device 13 fills the bottom coils and works itself upwardly. If liquid refrigerant were introduced at the top it might run down the coils before it vaporized. The outlet 63 is not, however, at the top of the evaporator assembly. This is necessitated by the fact that the water is warmest at the top, as it comes from the distributor 7, and the last section of the serpentine coils 38 is usually the warmest during the freeze cycle. This last section is spaced away from the top so that a colder section of the evaporator is closest to the top, where greater cooling provides a more even ice growth up and down the ice-forming mold 6.

During the defrost mode, the last section of serpentine tubing 38 generally heats up last. Therefore, the ice at other places in the ice-forming mold starts to melt and release first at the bottom of the ice-forming mold, and last in the area in front of the piece of tubing 38 connected to the outlet 63. The holes 52 should be located as near as possible to this part of the ice-forming mold, preferably just above this last length of the coil 38. In tests where holes were placed in the center or bottom section of the ice-forming mold, and in tests where holes in the bottom were also used along with the holes in the preferred location shown in FIG. 5, the ice did not harvest in an optimum fashion. The slab either broke, and only the bottom section harvested, or the entire slab took longer to harvest, presumably because the bottom part of the slab started to come out while the top was not released, causing the slab to twist and thus get wedged in the pockets, until enough had melted for it to all come free and slide out. As can be seen, the preferred number of holes 52 is much less, preferably less than one-tenth, or even less than one one-hundredth, of the number of pockets 33. It is preferred to use only four holes on an evaporator 29½ inches wide, which may have up to 1054 pockets.

The pressure of the air used in the harvest assist was also found to be a significant factor in optimizing the harvest. Where adequate air flow is also provided, it is preferred to use a pressure of between about ¼ and 1 psig, with ¾ psig being most preferred at normal ambient temperatures, and 1 psig at cold ambient temperatures. Higher pressures of 10 to 20 psig can be used, but have been found to only slightly improve harvest times. Higher pressures were found to be either unhelpful or even detrimental. A pressure of ¼–1 psig is sufficient so that pressurized air can displace water melted from the ice and migrate between pockets. Under standard operating conditions of 90° F. ambient air temperature and 70° F. inlet water temperature, in one test machine, it took 75–90 seconds to harvest without air assist, 40–45 seconds with an air pressure of ¼–1 psig, and 30–35 seconds with an air pressure of 15 psig. However, a compressor sufficient to produce 15 psig is more expensive and nosier than a compressor that produces ¼–1 psig. Thus the lower pressure is preferred because such pressures are easy to generate and give significant improvement in harvest times.

The weep holes 31 allow pressurized air introduced in one pocket to pass into the other pockets between the ice cubes and the back surface 35 of the ice-forming mold. In this manner the air pressure is applied over a large surface area, the back side of all of the pockets into which it migrates, before the ice is released.

In one embodiment of the invention, as shown in FIG. 8 and discussed above, a pressure regulator 55 is used to maintain the desired pressure. The pressure regulator 55 may be a relief valve so that the air compressor 54 does not dead head as it is working while the ice is defrosting. Alternatively, as in FIG. 13, the pressure regulator may be a capillary tube 455, preferably about six inches long, with an inside diameter of about 0.04 to about 0.06 inches, and most preferably an inside diameter of about 0.052 to 0.054 inches. The preferred length of the capillary tube will depend on the internal diameter of the tube, and the overall volume of the lines 457 and 458 and manifold 456. Otherwise the rest of the system is the same as shown in FIG. 8. Components in FIG. 13 have thus been given the same reference number, with an addend of 400, as the same components used in the embodiment of FIG. 8.

When a capillary tube 455 is used, the capillary tube and the size of the manifold allow time for the compressor to start and build up momentum before the pressure gets too high. Once the ice starts to release, the flow of air from the compressor needs to be high enough so that the entire volume in the space between the slab of ice and the ice-forming mold can continue to be filled with pressurized air. In that regard it is best to have a compressor 54 that can maintain an air flow of 0.2–0.4 cfm at 1 psig per square foot of ice-forming mold front surface area. For example, for optimum results an ice-forming mold 29½ inches wide and 17 inches tall would need a compressor that could supply 0.7 to 1.4 cfm of compressed air at 1 psig.

Once the ice is released, the water curtain 5 is deflected outwardly by the falling ice. As is conventional, this trips a switch to cycle the ice machine back into the freeze mode. The air compressor 54 turns off when the bypass solenoid 40 is closed.

Another modification, shown in FIG. 12, is to delay the time at which the compressor 354 starts to run. This however requires another relay on the ice machine control circuit board 381, one controlling the hot gas solenoid valve 340 and one controlling the air compressor 354. No pressure regulator is shown because it is normally not necessary. Otherwise, the harvest assist system has the same components as those shown in FIG. 8, such as lines 357 and 358, intake 368, manifold 356, and evaporator pan 332. In one test, it took 15–30 seconds after the harvest mode began before the ice was melted enough to start the release. Therefore the introduction of a pressurized fluid is delayed for a period of time after the heating begins. A preferred delay is between about 5 and about 30 seconds, more preferably about 15–25 seconds, and most preferably about 25 seconds for 1000, 1300 and 1800 pound capacity evaporators. The air pressure can thus be applied either at the time heating begins, or after heating begins. Of course pressure should be applied until harvest occurs. It may be possible to stop the heating and then apply air pressure. The only requirement is that the pressure be applied in conjunction with heating.

If no delay time is provided, and the compressor is started at the same time that the hot gas bypass valve is opened, then some type of pressure relief may be needed, such as the pressure regulator or capillary tube discussed above. Also, even if a delay is used, there may be times when pressure relief will still be needed, such as when a large compressor 14 is used and the machine is operating in a cold ambient temperature.

Rather than a pressure regulator or relief valve, it is also possible to size the volume of the air system to accommodate the build up of air pressure until the ice starts to release. While the air system volume is a tool that can be used, it was found to not be needed with small compressor. With small compressors it is desirable to keep the volume of the air system as small as possible.

It is preferred that the compressor 54 be an oil-less compressor, so that oil does not contaminate the air used to assist with the ice harvest. The intake 68 for the air compressor 54 may be located so that air from the water compartment is drawn into the compressor 54. A piston-and-cylinder type air compressor is preferred, such as model no. 689 CGHI44 when a pressure of 10–20 psig is used, or more preferably a model no. 011CD26 from Thomas Industries, Sheboygan, Wis., which can provide 0.2–0.3 CFM at 1 psi. A model PR25 pressure control valve, which is a variable pressure relief valve, from Control Devices, Inc. St. Louis, Mo., may be used as the pressure regulator 55 when the higher pressure is used. No pressure regulator is needed with low pressure compressors.

U.S. Pat. No. 5,586,439 discloses a cleaning system for an ice machine. It is contemplated that the cleaning system from that patent could be modified so that during cleaning and/or sanitizing operations, some of the cleaning and/or sanitizing solution could be pumped through a tee (not shown) in line 57, the manifold 56, lines 58, the fittings 53 and holes 52 to be sure that they did not become a source of bacterial growth, since the holes and fittings are exposed to the water just like the rest of the ice-forming mold 6. Also, the material used for the fittings 53, lines 57 and 58, as well as for the compressor 54, pressure regulator 55 and manifold 56 should be food grade material that is easily cleaned.

Significant improvements in energy efficiency have been demonstrated in prototype equipment using the present invention. For example, a stock QY-1304A Manitowoc machine was tested with a 20,000 BTU compressor. Without the harvest assist, it produced 1110 pounds of ice/day at Air Conditioning and Refrigeration Institute (ARI) standard test conditions (90° F. ambient air temperature, 70° F. potable water inlet temperature) at an energy cost of 6.0 kwh/100 pounds of ice. The same machine, equipped with a 14,000 BTU compressor and the harvest assist system of FIG. 8, was able to produce 1085 pounds of ice/day at standard operating conditions, at an energy cost of only 4.6 kwh/100 pounds of ice. This is a very significant improvement in energy efficiency.

There are numerous changes to the harvest assist system which are possible. An accumulator may be added to the air system so that a sufficient volume of compressed air can be produced with a smaller compressor. The pressure regulator 55 may be in line as shown in FIG. 8, or it may be located on the body of the compressor 54. Another alternative embodiment is shown in FIG. 9. In this embodiment, the signal to the hot gas solenoid 140 is also conveyed through electrical line 151 to start air compressor 154 to intake air from intake 168, just as in the embodiment of FIG. 8. However, downstream of the pressure regulator 155, manifold 156 and lines 157, but before the evaporator pan 132, air lines 158 are connected to multiple air cylinders 159. These cylinders have pistons that act through holes in the back side of evaporator pan 132 to push the ice slab out. By having multiple pistons, all tied to one manifold, a uniform force can be applied across several points. Also, the force can be easily controlled by the pressure regulator. In this embodiment it would be best to have holes in the back of each ice-forming pocket so that air could be drawn in through the holes to break the vacuum otherwise formed as the ice cubes release from their pockets. One advantage of the embodiment of FIG. 9 is that the capacity of the air compressor 154 may be reduced.

A number of other alternative embodiment use different sources of pressurized fluid. For example, a pressurized gas, such as $CO_2$ from a post mix beverage system located near the ice machine, could be used to pressurize the manifold 56. Pressurized air or $CO_2$ from a cylinder stored on board the ice machine could be used. Because of the cost of air compressors, it may be desirable to use a blower instead of a compressor. Other equipment already on the ice machine, such as the water pump or condenser fan motor, may be harnessed as a source of power to provide compressed air. Even the water pressure from the inlet water line may be used to pressurize air in a diaphragm type bladder device, although this may result in unacceptable water usage and waste. Even water could be used as the pressurized fluid. However, experiments with water were not very successful because the pressure seemed to be too localized and the water was too warm so that it melted the ice. If colder water were used, pressurized water may be useable as the pressurized fluid.

The present invention has other benefits besides increased energy efficiency. Because the harvest time is shorter, decreased by about 50% in some tests, the ice-forming mold does not heat up as much. This reduces the amount of mineral deposits that gets left on the ice-forming mold on each cycle. Thus the ice-forming mold is easier to clean.

One significant improvement is that higher capacities of ice can be made with roughly the same size of equipment. As noted above, the harvest time is decreased. The performance of the machine is enhanced in other ways. The freeze time is decreased because the evaporator assembly does not heat up as hot. Therefore the machine is in an ice making mode a higher percentage of its operating time. In addition there is more ice per cycle because less ice melts during the harvest cycle. All of these items result in higher capacity, measured in pounds of ice per day. For example, with a stock QY-1004A ice machine the capacity of the machine can be increased by about 25% while reducing energy usage by about 20%. Thus ice machines with the harvest assist can be used in places where larger machines with greater capacities would have been used. Also, with faster harvests, the amount of refrigerant that condenses and comes back into the compressor during the harvest cycle is reduced. This results in less stress on compressors, yielding longer life and/or the ability to use compressors that are less expensive, or to remove accumulators frequently required in the refrigeration system.

Because the harvest can be achieved in a reduced amount of time, a higher flow rate of hot gas through bypass value 40 may be used. The flow rate is frequently controlled by the size of orifice used in the valve. As an example, an EVU 6 orifice can be used instead of an EVU 5 orifice in a Danfoss bypass valve. This increases the flow rate by about 25%. For example, at the end of the freeze cycle for one ice machine, about 116 lb/hr of refrigerant are flowing through the system. However with an appropriately sized orifice in the bypass valve, about 600 lb/hr of refrigerant can flow during the defrost cycle in the same machine.

It will be appreciated that the addition of some other process steps, materials or components not specifically included will have an adverse impact on the present invention. The best mode of the invention may therefore exclude process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. For example, instead of forming individual cubes initially, a slab of ice may be formed and then divided into cubes. All changes which come within the meaning and range of equivalency of the claims are to be embraced within their scope.

We claim:

1. An ice making machine comprising:
   a) a refrigeration system including a compressor, a condenser, an expansion device, an evaporator made with refrigerant channels formed in a serpentine shape, and interconnecting lines therefore;
   b) a water system including a pump and an ice-forming mold having a back surface and an open front face to form a slab of ice, the serpentine channels of the evaporator being in thermal contact with the back surface of the ice-forming mold; and interconnecting lines therefore; and
   c) a harvest assist system comprising the at least one hole through the back surface of the ice-forming mold and a source of pressurized gas connected to the at least one hole.

2. The ice making machine of claim 1 wherein the ice forming mold further comprises dividers that form individual pockets in which individual ice cubes are frozen, with ice bridging over the dividers at the front face to form the slab made of interconnected ice cubes.

3. The ice making machine of claim 1 wherein the refrigerant channels comprise tubing formed in a serpentine shape.

4. The ice making machine of claim 1 wherein the source of pressured gas comprises an air compressor.

5. The ice making machine of claim 4 wherein the air compressor is an oil-less compressor.

6. The ice making machines of claim 4 wherein the air compressor is a piston-and-cylinder type compressor.

7. The ice making machine of claim 1 wherein the at least one hole comprises a plurality of holes and the source of pressurized gas includes a manifold and a plurality of gas lines interconnecting the manifold and the plurality of holes.

8. The ice making machine of claim 1 wherein the at least one hole has a diameter of about ⅛ inch.

9. The ice making machine of claim 1 wherein the at least one hole comprises either 3 or 4 holes.

10. The ice making machine of claim 4 wherein a relief valve is used to control the pressure of the air being supplied to the holes.

11. The ice making machine of claim 1 wherein the water system further comprises a water distributor tube.

12. A method of making and harvesting ice cubes comprising:
    a) freezing water in an ice-forming mold having a back surface, an open front face and dividers mounted on the back surface forming pockets for the formation of individual ice cubes, the water also forming ice bridges between the ice formed in the pockets, thus forming a slab of ice cubes;
    b) heating the ice-forming mold to release the ice cubes from their individual pockets; and
    c) using pressurized gas to break any vacuum and begin to push the frozen slab of ice cubes out of the ice-forming mold.

13. The method of claim 12 wherein the pressurized gas is air.

14. The method of claim 12 wherein the pressurized gas is used at a pressure of between about ¼ and 1 psig.

15. The method of claim 13 wherein the dividers have weep holes that allow pressurized gas introduced in one pocket to pass into the other pockets between the ice cubes and the back surface of the ice-forming mold.

16. The method of claim 12 wherein pressurized gas is introduced through one or more holes in the back surface of the ice-forming mold to directly act against the ice formed in the pockets.

17. The method of claim 12 wherein heating is started about 5 to about 30 seconds before the pressurized gas is supplied.

18. The method of claim 12 wherein the pockets have a bottom surface that is sloped downwardly at the front so that the pressurized gas assists in causing the released ice cubes to fall from the ice-forming mold.

19. The method of claim 12 wherein the heating is accomplished by passing a refrigerant through serpentine coils in thermal contact with the back surface and allowing the refrigerant to condense in the coils.

20. The method of claim 19 wherein the freezing of the water is accomplished by vaporizing a liquid refrigerant in the serpentine coils.

21. The method of claim 20 wherein a compressor is used to compress the refrigerant, which is fed to a condenser and then an expansion device before it passes into the coils to vaporize during a freezing cycle, and which bypasses the condenser and expansion device and passes into the coils as a vapor during a defrost cycle.

22. A method of improving the energy efficiency of an ice making machine that forms individual cubes of ice in an ice-forming mold with ice bridges between the cubes to form a slab, the improvement comprising:
    a) introducing pressurized air between the slab of ice and the ice-forming mold in conjunction with heating the ice-forming mold to assist release of the cubes of ice.

23. The method of claim 22 wherein the ice-forming mold is heated unevenly so that the cubes of ice release later at some parts of the mold than at other parts of the mold, and the pressurized air is introduced near the location where the ice is released last.

24. The method of claim 22 wherein the pressurized air is introduced at a pressure of between about ¼ and 1 psig.

25. The method of claim 22 wherein the pressurized air is introduced at the same time heating of the ice-forming mold is started.

26. The ice making machine of claim 2 wherein the at least one hole comprises a number of holes less than one-tenth of the number of pockets in the ice-forming mold.

27. The ice making machine of claim 2 wherein the at least one hole comprises a number of holes less than one one-hundredth of the number of pockets in the ice-forming mold.

28. The ice making machine of claim 4 wherein a capillary tube is used to control the pressure of the air being supplied to the holes.

29. The ice making machine of claim 28 wherein the capillary tube has an internal diameter of between about 0.04 and about 0.06 inches.

30. The method of claim 22 wherein the pressurized air is introduced at a period of about 5 seconds to about 30 seconds after heating of the ice-forming mold is started.

31. The ice making machine of claim 1 wherein the at least one hole is provided by a barbed fitting that has a central tubular section with a knurled shoulder and a flange on one end and the barbed tubing connector on the other end.

* * * * *